US010445598B1

United States Patent
Ghannam et al.

(10) Patent No.: US 10,445,598 B1
(45) Date of Patent: Oct. 15, 2019

(54) GARAGE DOOR DETECTION FOR A VEHICLE

(71) Applicant: Ford Global Technologies, LLC, Dearborn, MI (US)

(72) Inventors: Mahmoud Yousef Ghannam, Canton, MI (US); Brian Bennie, Sterling Heights, MI (US); Gabrielle Gibbons, Milford, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/944,438

(22) Filed: Apr. 3, 2018

(51) Int. Cl.
| | |
|---|---|
| G06K 9/00 | (2006.01) |
| B60R 1/00 | (2006.01) |
| B60W 30/09 | (2012.01) |
| G06T 7/70 | (2017.01) |

(52) U.S. Cl.
CPC ............ *G06K 9/00805* (2013.01); *B60R 1/00* (2013.01); *B60W 30/09* (2013.01); *G06T 7/70* (2017.01); *B60R 2300/8086* (2013.01); *B60R 2300/8093* (2013.01); *G06T 2207/10016* (2013.01); *G06T 2207/30261* (2013.01)

(58) Field of Classification Search
CPC ............... G06K 9/00805; G06T 7/70; G06T 2207/10016; G06T 2207/30261; B60R 1/00; B60R 2300/8086; B60R 2300/8093; B60R 2300/806; B60R 11/04; B60R 2300/30; B60R 2300/305; B60R 2300/307; B60R 2300/60; B60R 2300/802; B60R 2300/8066; B60R 9/04; B60W 30/09; G08G 1/16; G08G 1/04; G08G 1/096708; G08G 1/168; B60Q 9/005; B60Q 1/48; B60Q 5/005; B60Q 9/002; B60Q 9/006; A01D 34/008; B60G 17/0165; B60G 2400/252; B60G 2400/823; B60G 2500/30; B60G 2800/914
See application file for complete search history.

(56) References Cited

U.S. PATENT DOCUMENTS

| | | | |
|---|---|---|---|
| 6,779,581 B2 | 8/2004 | Towley | |
| 7,136,754 B2 | 11/2006 | Hahn et al. | |
| 9,656,691 B2 | 5/2017 | Heimberger et al. | |
| 9,718,402 B2 | 8/2017 | Smyth et al. | |
| 9,937,906 B1* | 4/2018 | Stell | .......................... B60T 7/22 |
| 2004/0183661 A1 | 9/2004 | Bowman | |

(Continued)

FOREIGN PATENT DOCUMENTS

DE    102016002042 A1    8/1917

*Primary Examiner* — James J Yang
*Assistant Examiner* — Kevin Lau
(74) *Attorney, Agent, or Firm* — Frank Lollo; Eversheds Sutherland (US) LLP

(57) ABSTRACT

Method and apparatus are disclosed for garage door detection for a vehicle. An example vehicle includes a rearview camera, memory, and a processor. The rearview camera monitors a garage door. The memory stores a first height associated with a field of view of the rearview camera and a second height. The a processor, when a bottom edge of the garage door exceeds the first height, calculates a time until the bottom edge will reach the second height. Additionally, until the calculated time, the processor prevents movement of the vehicle.

19 Claims, 3 Drawing Sheets

(56) References Cited

U.S. PATENT DOCUMENTS

| | | | |
|---|---|---|---|
| 2005/0075770 A1* | 4/2005 | Taylor .................... | B60Q 9/005 |
| | | | 701/36 |
| 2005/0131645 A1* | 6/2005 | Panopoulos .......... | B60P 1/5457 |
| | | | 701/472 |
| 2017/0186319 A1 | 6/2017 | Tsushima et al. | |

* cited by examiner

GARAGE DOOR DETECTION FOR A VEHICLE

TECHNICAL FIELD

The present disclosure generally relates to vehicle rear view camera systems and, more specifically, garage door detection for a vehicle.

BACKGROUND

Drivers, when in a hurry, often back into a closed or partially opened garage door. Rear view camera systems assist drivers backing up by presenting an image behind the vehicle on a center console or rear view mirror. However, the field of view (FOV) of the rear view camera is aimed downwards to facilitate the driving seeing the immediate rearward path of the vehicle. Because of this angular limitation, a partially opened garage door may be in a position that does not provide clearance for the vehicle but is not in the FOV of the rear view camera.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for garage door detection for a vehicle. An example vehicle includes a rearview camera, memory, and a processor. The rearview camera monitors a garage door. The memory stores a first height associated with a field of view of the rearview camera and a second height. The processor, when a bottom edge of the garage door exceeds the first height, calculates a time until the bottom edge will reach the second height. Additionally, until the calculated time, the processor prevents movement of the vehicle and provide a warning to the driver or virtual driver system regarding the expected garage door in the driving space.

An example method includes storing a first height associated with a field of view of a rearview camera and a second height. The example method also includes monitoring, with the rearview camera, a garage door. The method includes, when a bottom edge of the garage door exceeds the first height, calculating a time until the bottom edge will reach the second height. Additionally, the method includes, until the calculated time, preventing movement of the vehicle and providing a warning to the driver or virtual driver system regarding the expected garage door in the driving space.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
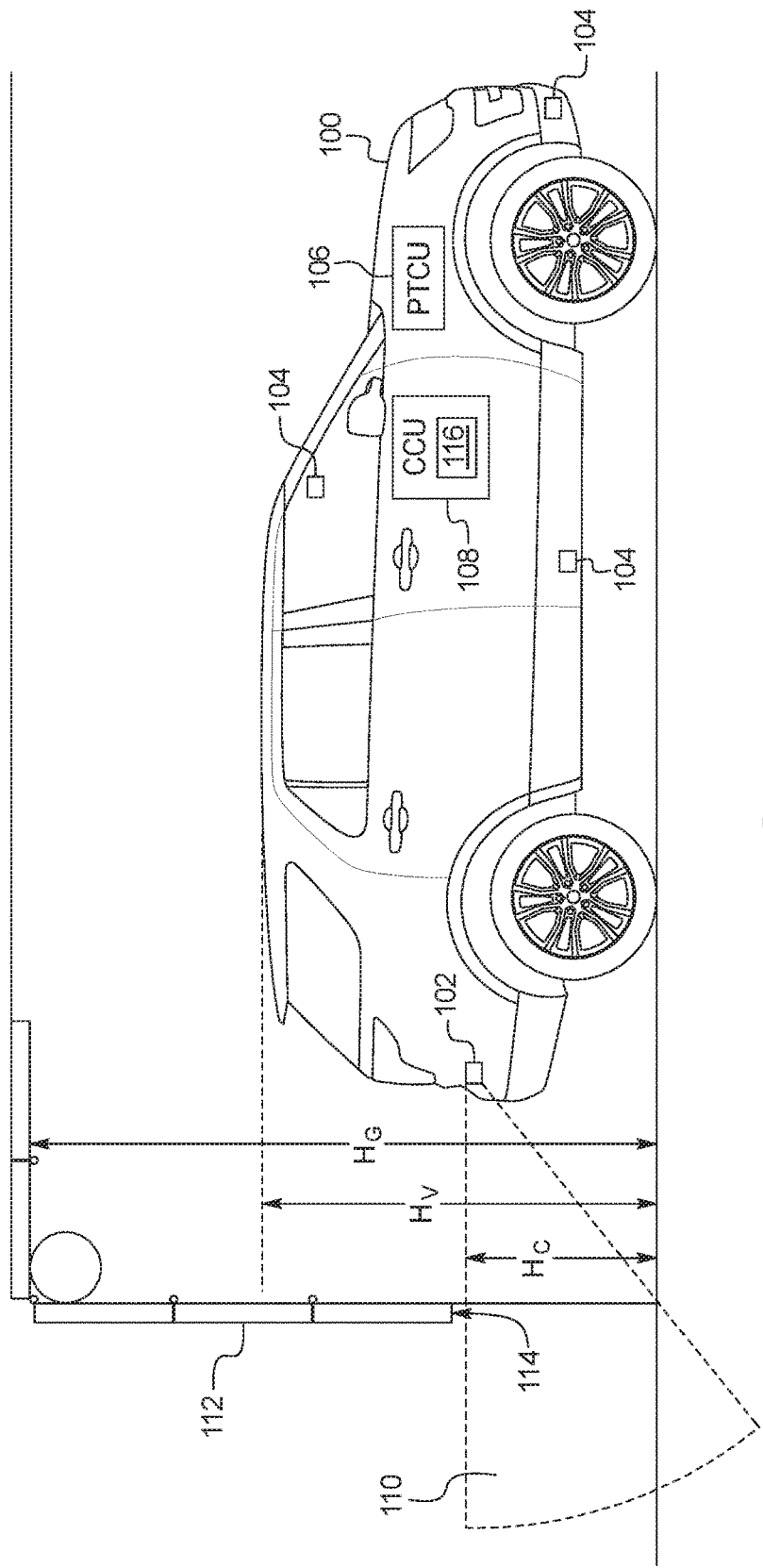
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

The field of view of a rearview camera is limited. Generally, the camera is angled downward so that the road immediately behind the vehicle is presented to the driver. However, because of this, there is a span of time in which the garage door is not within the view of the rearview camera and the garage door is not raised enough to provide clearance for the vehicle. In such situations, a driver may think that the garage door is open when it is not. As described below, the monitors whether it is parked in a garage. When it is parked in a garage, the vehicle monitors the area around the vehicle for an operator (e.g., driver, etc.). In some examples, the vehicle uses range detection sensors (e.g., radar, lidar, ultrasonic sensors, cameras, etc.) to detect the operator. Alternatively or additionally, in some examples, the vehicle detects the operator based on the presence of a key fob and/or a mobile device (e.g., a smart phone, a smart watch, a tablet, etc.) within a threshold distance of the vehicle. When the operator is detected, the vehicle monitors for movement of the garage door via the rearview camera. Additionally, the vehicle prevents movement of the vehicle (e.g., prevent ignition of the engine, prevents placing transmission into reverse, engages brakes, etc.). The vehicle continues to monitor the movement of the garage door until the garage door is no longer within the view of the rearview camera. Additionally, as the garage door moves, the vehicle determines a speed of the garage door (e.g., based on a time when the motion begins to a time when the garage door leaves the view of the rearview camera, etc.). Based on the calculated speed after the garage door leaves the view of the rearview camera, the vehicle determines an amount of time after which the garage door will be open enough to provide clearance to the vehicle. After that amount of time, the vehicle enables movement.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a rearview camera 102, sensor(s) 104, a power train control unit (PTCU) 106, and a camera control unit (CCU) 108.

The rearview camera 102 is position on the rear of the vehicle 100 (e.g., proximate the rear license plate area). The rearview camera 102 has a field of view 110 that is generally pointed towards the ground so that the roadway immediately behind the vehicle 100 is captured. The field of view 110 of the rearview camera 102 captures images of a garage door 112 as long as the garage door is below a camera height ($H_C$). That is, from a closed position wherein the garage door 112 is touching the floor surface to the point at which the garage door is no longer visible in the field of view 110 of the rearview camera 102, a bottom edge 114 of the garage door 112 vertically travels a distance of the camera height ($H_C$). The images captured by the rearview camera 102 are displayed on a display in the cabin of the vehicle 100, such as a center console display and/or a rearview mirror display.

The sensors 104 may be arranged in and around the vehicle 100 in any suitable fashion. The sensors 104 may mounted to measure properties around the exterior of the vehicle 100. Additionally, some sensors 104 may be mounted inside the cabin of the vehicle 100 or in the body of the vehicle 100 (such as, the engine compartment, the wheel wells, etc.) to measure properties in the interior of the vehicle 100. For example, such sensors 104 may include accelerometers, odometers, tachometers, pitch and yaw sensors, wheel speed sensors, microphones, tire pressure sensors, and biometric sensors, etc. In the illustrated example, the vehicle 100 include sensors 104 include sensors to detect the operator (e.g., radar, lidar, ultrasonic sensors, cameras, etc.) and/or sensors to detect the presence and distance of a key fob and/or mobile device (e.g., a smart phone, a smart watch, a tablet, etc.) associated with the operator (e.g. a Bluetooth® or Bluetooth® Low Energy beacon, a wireless node, etc.).

The power train control unit 106 is an electronic control unit that controls functions of the engine system and the transmission system of the vehicle 100. The power train control unit 106 controls the brakes of the vehicle 100, the transmission of the vehicle 100, and/or the immobilizer of the vehicle 100. As such, the power train control unit 106 controls whether the vehicle 100 moves and/or the vehicle 100 responds to input (e.g., turning the ignition switch, shifting gears, releasing the brake, etc.) from the operator. For example, the power train control unit 106 may prevent ignition of the engine, prevent shifting the transmission into reverse, and/or engage the brakes and not accept input from an accelerator pedal.

The camera control unit 108 determines when the bottom edge 114 of the garage door 112 has move to at least a clearance height ($H_V$) of the vehicle 100. The camera control unit 108 stores the camera height ($H_C$) and the vehicle clearance height ($H_V$) in memory (e.g., the memory 208 of FIG. 2 below). In some examples, the camera control unit 108 also stores the height of the garage ($H_G$) in memory. The camera height ($H_C$) is the height of the top of the field of view 110 of the rearview camera 102 when the tires of the vehicle 100 are inflated to the minimum allowable tire pressure (e.g., e.g., 41 kilopascals (6 psi) under the recommended inflation, etc.) For example, the camera height ($H_C$) may be 61 centimeters (24 inches). The vehicle clearance height ($H_V$) is a height of the highest point on the vehicle 100 when the tires are at the maximum allowable tire pressure (e.g., 41 kilopascals (6 psi) over the recommended inflation, etc.) plus an error factor (e.g., 2.24 to 7.62 centimeters (1 to 3 inches), etc.). For example, vehicle may have a vehicle clearance height ($H_V$) of 152 centimeters (60 inches). The height of the garage ($H_G$) is the height of the bottom edge 114 of the garage door 112 when the door is fully open. In some example, the height of the garage ($H_G$) is input into the vehicle 100 (e.g., via the center console display). Alternatively, in some examples, the camera control unit 108 determine the height of the garage ($H_G$) using the range detection sensors (e.g., lidar, etc.). Alternatively, in some examples, the height of the garage ($H_G$) is a standard or average value (e.g., 1.88 centimeters (74 inches), etc.).

In the illustrated example, the camera control unit 108 includes a garage monitor 116. The garage monitor 116 monitors movement of the garage door 112 (e.g., the bottom edge 114 of the garage door 112) and determines when there is clearance for the vehicle 100 to exit the garage. The garage monitor 116 the determines whether the vehicle 100 is parked in a garage. In some examples, the garage monitor 116 uses coordinates from a global positioning system (GPS) receiver. In some such examples, the garage monitor 116 determines that the vehicle 100 is in the garage when the vehicle 100 is at a set of GPS coordinates at certain times of the day over a period of time. For example, the garage monitor 116 may determine that a set of coordinates is associated with a garage when the vehicle 100 is parked at those coordinates for a period of time (e.g., 4 hours, etc.) at night a threshold period of times. In some examples, the garage monitor 116 detects the garage door 112 behind the vehicle 100 via the rearview camera 102. In some examples, the garage monitor 116 detects a identifier (such as a service set identifier (SSID)) of a wireless network associated with the garage (e.g., deployed in a residence associated with the garage, etc.).

When vehicle 100 is parked in a garage, the garage monitor 116 monitors the area around the vehicle 100 for an operator (e.g., driver, etc.). In some examples, the garage monitor 116 detects the operator using the sensors 104 (e.g., radar, lidar, ultrasonic sensors, cameras, etc.). Alternatively or additionally, in some examples, the garage monitor 116 detects the operator based on the presence of a key fob and/or a mobile device (e.g., a smart phone, a smart watch, a tablet, etc.) within a threshold distance of the vehicle 100. When the operator is detected, the garage monitor 116 monitors for movement of the garage door 112 via the rearview camera 102. Alternatively, while in the garage, the garage monitor 116 continually monitors the garage door 112 for movement.

When movement of the garage door is detected, the garage monitor 116 prevents movement of the vehicle 100 (e.g., by instructing the power train control unit 106 to prevent ignition of the engine, to prevent placing transmission into reverse, and/or to engage the brakes, etc.). The garage monitor 116 continues to monitor the movement of the garage door 112 until the bottom edge 114 of the garage door 112 is no longer within the view 110 of the rearview camera 102. Additionally, as the garage door 112 moves, the garage monitor 116 determines a speed of the garage door 112. The garage monitor 116 calculates the speed using (a) the time that elapsed from the garage door 112 starting to move to when the bottom edge 114 of the garage door 112 exits the view 110 of the rearview camera 102 and (b) the camera height ($H_C$). Using the calculated speed, the garage monitor 116 determines an amount of time after which the bottom edge 114 of the garage door 112 will be open to at least the vehicle clearance height ($H_V$) or, in some examples, the height of the garage ($H_G$). After that calculated amount of time has elapsed, the garage monitor 116 enables movement of the vehicle 100. In some examples, the garage monitor 116 provides an audio, visual, and/or haptic alert inside the vehicle 100 (e.g., on the center console display, on the speakers, on the steering wheel, etc.) to provide status information to the operator. For example, the garage monitor 116 may provide a visual alert via the center console display regarding the status of the garage door 112 (e.g., whether it is open enough) and an audio alert over the speakers informing the operator the amount of time until movement of the vehicle 100 is enabled.

Figure 2:
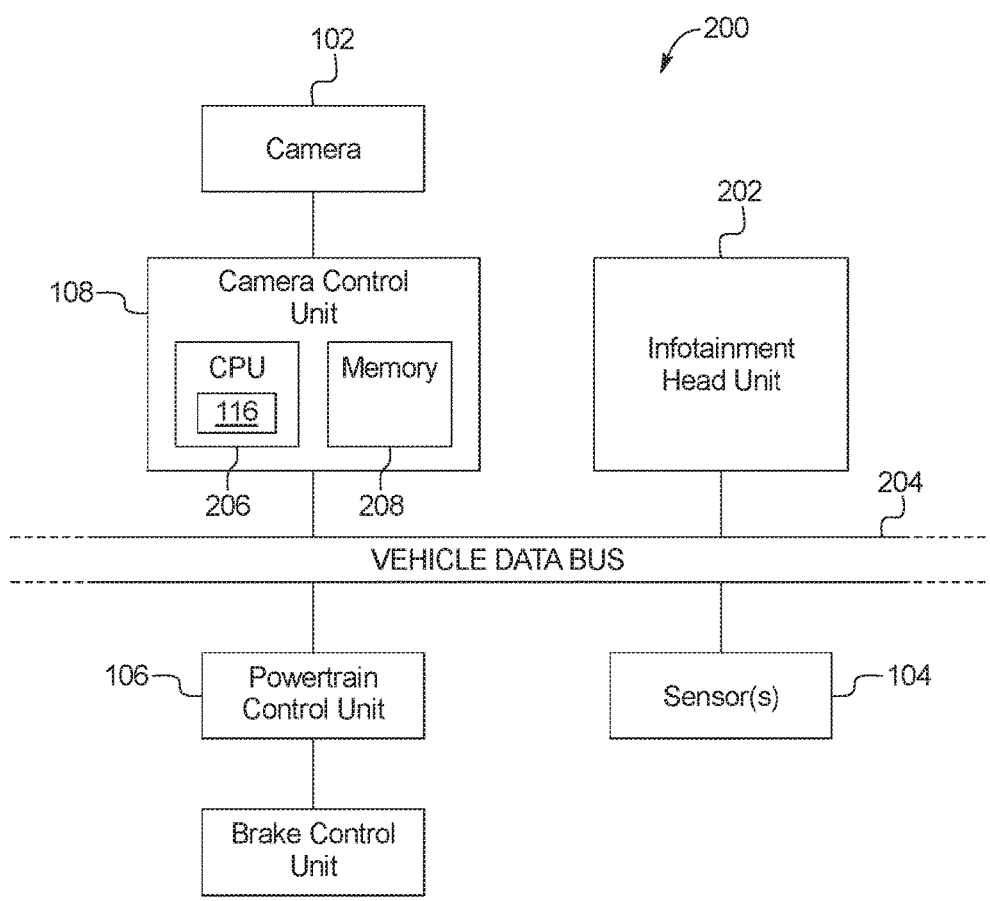
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the rearview camera 102, the sensors 104, the power train control unit 106, the camera control unit 108, an infotainment head unit 202, and a vehicle data bus 204.

The infotainment head unit 202 provides an interface between the vehicle 100 and the operator. The infotainment head unit 202 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the camera control unit 108 is incorporated into the infotainment head unit 202. In the illustrated example, the infotainment head unit 202 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 202 displays the infotainment system on, for example, the center console display.

The camera control unit 108 includes a processor or controller 206 and memory 208. In the illustrated example, the camera control unit 108 is structured to include garage monitor 116. Alternatively, in some examples, the garage monitor 116 may be incorporated into another electronic control unit (ECU) with its own processor and memory, such as the power train control unit 106 or the infotainment head unit 202. The processor or controller 206 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 208 includes multiple kinds of memory, particularly volatile memory and non-volatile memory. In some examples, the memory 208 stores clearance height ($H_V$), the camera height ($H_C$) and/or the height of the garage ($H_G$).

The memory 208 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 208, the computer readable medium, and/or within the processor 206 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 204 communicatively couples the power train control unit 106, the camera control unit 108, and the infotainment head unit 202. In some examples, the vehicle data bus 204 includes one or more data buses. The vehicle data bus 204 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
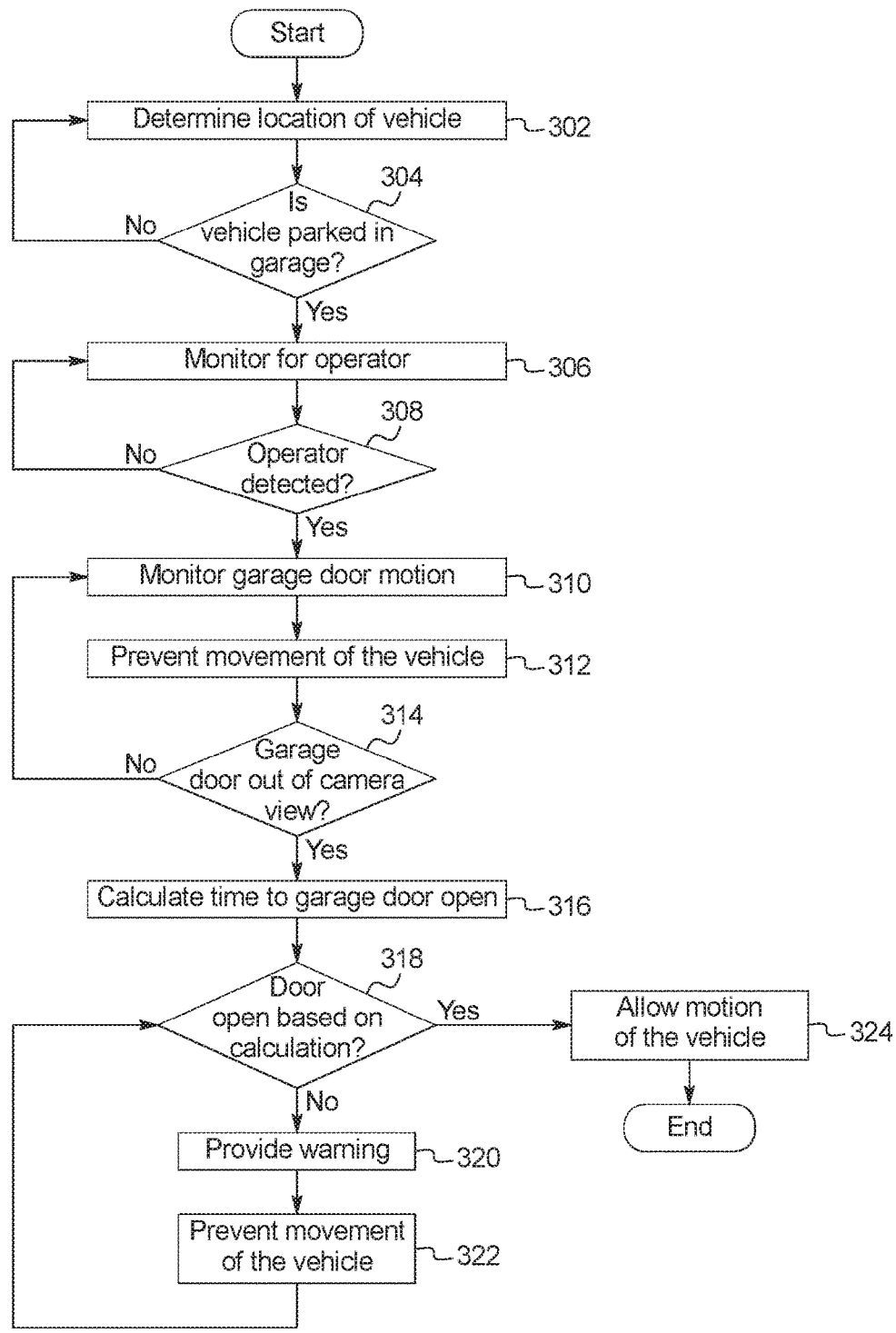
FIG. 3 is a flowchart of a method to detect when a garage door is open enough so that a vehicle can pass through, which may be implemented by the electronic components of FIG. 2.

FIG. 3 is a flowchart of a method to detect when the garage door 112 is open enough so that the vehicle 100 of FIG. 1 can pass through, which may be implemented by the electronic components 200 of FIG. 2. Initially, at block 302, the garage monitor 116 determines the location of the vehicle 100. At block 304, the garage monitor 116 determines whether the vehicle 100 is parked in a garage. When the vehicle 100 is parked in a garage, the method continues at block 306. Otherwise, when the vehicle 100 is not parked in a garage, the method returns to block 302.

At block 306, the garage monitor 116 monitors the area around the vehicle 100 for the operator. At block 308, the garage monitor 116 determines whether the operator is in the area around the vehicle 100. When the operator is detected, the method continues to block 310. When the operator is not detected, the method return to block 306. At block 310, the garage monitor 116 monitors movement of the bottom edge 114 of the garage door 112 via the rearview camera 102. At block 312, the garage monitor 116 prevents movement of the vehicle 100. At block 314, the garage monitor 116 determines whether the bottom edge 114 of the garage door 112 is still within the view 110 of the rearview camera 102. When the bottom edge 114 of the garage door 112 is not within the view 110 of the rearview camera 102, the method continues at block 316. Otherwise, while the bottom edge 114 of the garage door 112 is within the view 110 of the rearview camera 102, the method returns to block 310.

At block 316, the garage monitor 116 calculates a time until the bottom edge 114 of the garage door 112 is at or exceeds a threshold height (e.g., the clearance height ($H_V$) or the height of the garage ($H_G$)). The calculated time is based on the speed of the bottom edge 114 of the garage door 112 as observed by the rearview camera 102. At block 318, the garage monitor 116 determines whether the garage door 112 is open (e.g., the bottom edge 114 of the garage door 112 meets or exceeds the threshold). This determination is made based on the calculated time and not by a direct observation of the position of the garage door 112 after it has left the view 110 of the rearview camera 102. When the garage door 112 is not open, the method continues at block 320. Otherwise, when the garage door 112 is open, the method continues at 324. At block 320, the garage monitor 116 provides an alert to the operator. At block 322, the garage monitor 116 prevents movement of the vehicle 100. At block 324, the garage monitor 116 allows movement of the vehicle 100.

The flowchart of FIG. 3 is representative of machine readable instructions stored in memory (such as the memory 208 of FIG. 2) that comprise one or more programs that, when executed by a processor (such as the processor 206 of FIG. 2), cause the vehicle 100 to implement the example garage monitor 116 and/or, more generally, the example camera control unit 108 of FIGS. 1 and 2. Further, although the example program(s) is/are described with reference to the flowchart illustrated in FIG. 3, many other methods of implementing the example [garage monitor 116 and/or, more generally, the example camera control unit 108 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a rearview camera to monitor a garage door;
   memory to store a first height associated with a field of view of the rearview camera and a second height, the first height being a height at which the bottom edge of the garage door exits a top of the field of view of the rearview camera; and
   a processor to:
     when a bottom edge of the garage door exceeds the first height, calculate a time until the bottom edge will reach the second height; and
     until the calculated time, prevent movement of the vehicle.

2. The vehicle of claim 1, wherein the second height is a height at which the garage door is fully open.

3. The vehicle of claim 1, wherein the second height is a clearance height of the vehicle.

4. The vehicle of claim 1, wherein to calculate the time until the bottom edge will reach the second height, the processor is to determine a speed of the garage door.

5. The vehicle of claim 4, wherein determining the speed of the garage door is based on a length of time from when the bottom edge of the garage door starts to move from a ground position to when the bottom edge leaves the field of view of the rearview camera.

6. The vehicle of claim 1, wherein to prevent movement of the vehicle, the processor is to at least one of (a) prevent a transmission from being shifted into a reverse gear, (b) enable an immobilizer, or (c) engage brakes of the vehicle.

7. The vehicle of claim 1, wherein the processor is to, until the calculated time, provide an alert.

8. The vehicle of claim 1, wherein the processor is to:
   determine whether the vehicle is parked in a garage; and
   when the vehicle is parked in the garage, monitor the garage door with the rearview camera.

9. The vehicle of claim 1, wherein the processor is to:
   when the vehicle is parked in a garage, monitor an area around the vehicle for an operator; and
   when the operator is detected, monitor the garage door with the rearview camera.

10. A method comprising:
    storing, in memory, a first height associated with a field of view of a rearview camera and a second height, the first height being a height at which the bottom edge of the garage door exits a top of the field of view of the rearview camera;
    monitoring, with the rearview camera, a garage door;
    when a bottom edge of the garage door exceeds the first height, calculating, with a processor of a vehicle coupled to the memory, a time until the bottom edge will reach the second height; and
    until the calculated time, preventing movement of the vehicle.

11. The method of claim 10, wherein the second height is a height at which the garage door is fully open.

12. The method of claim 10, wherein the second height is a clearance height of the vehicle.

13. The method of claim 10, wherein calculating the time until the bottom edge will reach the second height includes determining a speed of the garage door.

14. The method of claim 13, wherein determining the speed of the garage door is based on a length of time from when the bottom edge of the garage door starts to move from a ground position to when the bottom edge leaves the field of view of the rearview camera.

15. The method of claim 10, wherein preventing movement of the vehicle includes at least one of (a) preventing a transmission from being shifted into a reverse gear, (b) enabling an immobilizer, or (c) engaging brakes of the vehicle.

16. The method of claim 10, including, until the calculated time, providing an alert.

17. The method of claim 10, including:
    determining whether the vehicle is parked in a garage; and
    when the vehicle is parked in the garage, monitoring the garage door with the rearview camera.

18. The method of claim 10, include:
    when the vehicle is parked in a garage, monitoring an area around the vehicle for an operator; and
    when the operator is detected, monitoring the garage door with the rearview camera.

19. A vehicle comprising:
    a rearview camera to monitor a garage door;
    memory to store a first height associated with a field of view of the rearview camera and a second height; and
    a processor to:

when a bottom edge of the garage door exceeds the first height:
  determine a speed of the garage door, and
  calculate a time until the bottom edge will reach the second height based on the speed of the garage door; and
until the calculated time, prevent movement of the vehicle.

\* \* \* \* \*